US008213956B2

(12) United States Patent
Sirola et al.

(10) Patent No.: US 8,213,956 B2
(45) Date of Patent: Jul. 3, 2012

(54) METHOD OF TRACKING A STATE OF A MOBILE ELECTRONIC DEVICE

(75) Inventors: Niilo Torsten Sirola, Tampere (FI); Simo Sakari Ali-Löytty, Tampere (FI)

(73) Assignee: Nokia Corporation, Espoo (FI)

( * ) Notice: Subject to any disclaimer, the term of this patent is extended or adjusted under 35 U.S.C. 154(b) by 395 days.

(21) Appl. No.: 12/224,767

(22) PCT Filed: Mar. 7, 2006

(86) PCT No.: PCT/EP2006/002272
§ 371 (c)(1),
(2), (4) Date: Jan. 21, 2009

(87) PCT Pub. No.: WO2007/101453
PCT Pub. Date: Sep. 13, 2007

(65) Prior Publication Data
US 2009/0233619 A1 Sep. 17, 2009

(51) Int. Cl.
*H04W 24/00* (2009.01)
*H04W 64/00* (2009.01)
*H04W 4/02* (2009.01)

(52) U.S. Cl. ............... 455/456.1; 455/456.5; 455/456.6; 340/539.13

(58) Field of Classification Search ....... 455/456.1–457, 455/404.1–404.2, 414.1–414.4, 440
See application file for complete search history.

(56) References Cited

U.S. PATENT DOCUMENTS

| 6,542,116 B1 | 4/2003 | Sahai et al. |
| 6,889,053 B1 * | 5/2005 | Chang et al. ............... 455/456.3 |
| 7,209,752 B2 * | 4/2007 | Myllymaki et al. ....... 455/456.1 |
| 2004/0072577 A1 | 4/2004 | Myllymaki et al. |

FOREIGN PATENT DOCUMENTS

| JP | 2001313972 | 11/2001 |
| JP | 2001313972 A * | 11/2001 |
| WO | WO 02/39063 | 5/2002 |
| WO | WO 0239063 A1 * | 5/2002 |

OTHER PUBLICATIONS

Bergman, Niclas. Bayesian Inference in Terrain Navigation. PhD Thesis No. 649. Linkoping University, Sweden, 1997.*
N. Bergman; "Bayesian Inference in Terrain Navigation;" Thesis; No. 649; 1997; Abstract and pp. 21, 33-38.

(Continued)

*Primary Examiner* — Ajit Patel
*Assistant Examiner* — Erica Navar
(74) *Attorney, Agent, or Firm* — Locke Lord LLP

(57) ABSTRACT

The invention relates to a method of tracking a state of a mobile electronic device and to a mobile electronic device including processing apparatus arranged to perform the method.
A method of tracking a state of a mobile electronic device, the method comprising iteratively performing:
(i) representing the state of the mobile electronic device using a grid comprising a plurality of cells, each cell representing a region in state space defined by one or more state variables and having a probability value that the state of the mobile electronic device is within that region in state space, the grid being bounded to include only cells having a probability value above a predetermined threshold;
(ii) obtaining measurement signalling indicating values of one or more state variables;
(iii) updating the probability values of the grid based on the measurement signalling and rebounding the grid.

17 Claims, 6 Drawing Sheets

OTHER PUBLICATIONS

J. Chaffee, et al; "GPS positioning, filtering, and integration;" Proceedings of the IEEE 1993 National Conference; May 24-28, 1993; Abstract and pp. 327-332.

R.S. Bucy, et al; "Digital synthesis of non-linear filters;" Automatica UK; vol. 7, No. 3; May 1971; pp. 287-298; whole document.

N. Bergman, et al; "Terrain navigation using Bayesian statistics;" IEEE Control systems Magazine; vol. 19, No. 3; Jun. 1999; pp. 33-40; whole document.

F. Dellaert, et al; "Monte Carlo localization for mobile robots;" Proceedings 1999 IEEE International Conference on Robotics and Automation; vol. 2; 1999; pp. 1322-1328; whole document.

D. Avis; "A Revised Implementation of the Reverse Search Vertex Enumeration Algorithm;" Jan. 26, 1999; whole document.

E. Doncker; "Methods for enhancing numerical integration;" 2003; Abstract and pp. 358-363.

D. Fox, et al; "Bayesian Techniques for Location Estimation;" Proceedings of Workshop on Location-aware Computer, part of UB/COMP Conference; Oct. 2003; pp. 16-18.

T. Roos, et al; "A Statistical Modeling Approach to Location Estimation;" IEEE Transactions on Mobile Computing; vol. 1, No. 1; Jan.-Mar. 2002; pp. 59-69.

M. Simandl, et al; "Anticipative Grid Design in Point-Mass Approach to Nonlinear State Estimation;" IEEE Transactions on Automatic Control; vol. 47, No. 4; Apr. 2002; pp. 699-702.

S. Sarkka, et al; "Rao-Blackwellized Monte Carlo Data Association for Multiple Target Tracking;" Proceedings of the Seventh International Conference on Information Fusion; vol. 1; Jun. 2004; pp. 583-590.

R. Schurer; "A comparison between (quasi-) Monte Carlo and cubature rule based methods for solving high-dimensional integration problems;" Mathematics and Computers in Simulation; 2003; pp. 509-517.

Q. Wei, et al; "A Method of Transferring Polyhedron Between the Intersection-Form and the Sum-Form; "Computers & Mathematics with Applications; 2001; pp. 1327-1342.

* cited by examiner

METHOD OF TRACKING A STATE OF A MOBILE ELECTRONIC DEVICE

CROSS REFERENCE TO RELATED APPLICATIONS

This application is the U.S. National Stage of International Application Number PCT/EP2006/002272 filed on Mar. 7, 2006 which was published in English on Sep. 13, 2007 under International Publication Number WO 2007/101453.

TECHNICAL FIELD

The invention relates to a method of tracking a state of a mobile electronic device and to a mobile electronic device including processing apparatus arranged to perform the method.

BACKGROUND OF THE INVENTION

One of the challenges in personal positioning is to provide accurate position information in situations where there are only a few measurement sources available that might have large errors with unusual distributions, particularly indoors or in urban areas, requiring the efficient numerical solution of the nonlinear filtering equations resulting from the fusion of these different measurement sources. In these cases, it is advantageous that the maximum amount of information be extracted from every measurement.

The behaviour of satellite-based systems such as GPS is unpredictable at best when used indoors in high-sensitivity mode. Local wireless networks, such as the cellular network, WLAN or Bluetooth offer some positioning capability but with inferior accuracy when compared to GPS. Other possible components of a mobile electronic device are the on-board sensors such as accelerometers, barometers or digital compasses.

Combining the various measurement sources is difficult because of different error characteristics, unpredictable distortions, systematic errors in measurements, strong nonlinearity, complex time dependencies, and missing data. It is not simple to model all the cases in a general way, let alone solve the models accurately. Even with correct models, the commonly used Kalman filter and its nonlinear extensions can fail without warning.

SUMMARY OF THE INVENTION

According to a first aspect of the invention, there is provided a method of tracking a state of a mobile electronic device, the method comprising iteratively performing the steps (actions) of
(i) representing the state of the mobile electronic device using a grid comprising a plurality of cells, each cell representing a region in state space defined by one or more state variables and having a probability value that the state of the mobile electronic device is within that region in state space, the grid being bounded to include only cells having a probability value above a predetermined threshold;
(ii) obtaining measurement signalling indicating values of one or more state variables;
(iii) updating the probability values of the grid based on the measurement signalling and rebounding the grid.

The state of the mobile electronic device may comprise the state variables including but not limited to position, velocity, acceleration, and clock error, whether alone or in combination.

The number of dimensions of the state space corresponds to the total number of dimensions of the state variables, with each cell including a number of dimensions equal to that of the state space. For example, the state space and the cells may be six-dimensional to represent position in three dimensions and velocity in three dimensions.

The invention provides a memory whereby all information is retained from measurement geometries that do not produce a unique position solution or that produce multiple solutions, and whereby the shape of the posterior distribution is retained without dropping any of its peaks.

The invention is faster to run than a particle filter, is more general than location fingerprint methods, and propagates the complete position distribution, thus being able to represent undetermined or multiple-solution systems accurately.

Preferably, the grid is a uniformly-spaced parallelepiped grid, in order to alleviate problems regarding the computation load of the method.

Step (i) in respect of one or more iterations may comprise obtaining measurement signalling and forming the grid based on the measurement signalling. A position estimate may be derived from measurement signalling comprising any of, for example, a range, a range difference or a planar measurement. A range measurement may be obtained from cellular base stations, WLAN or Bluetooth transmitters, and/or acoustic sensors, and may be in the form of a time delay, round-trip or signal strength measurement, for example. Other types of measurement signalling indicating position include but are not limited to angle of arrival measurements, maximum-minimum range windows, base sector information, and on-board barometers and digital compasses. Velocity can be measured using deltarange and heading measurements. Acceleration can be measured using on-board accelerometers.

It is to be understood that the details of the measurement signalling are not important to the invention, provided that the value(s) of the state variable(s) in question can be obtained or estimated using the measurement signalling, whether used alone or in conjunction with other measurement signalling.

Step (i) in respect of one or more of a second and subsequent iterations may comprise using the updated grid of step (iii) of a preceding iteration.

The one or more iterations may comprise the step of (iv) predicting the probability values of the grid of the subsequent iteration based on the updated grid and a motion model for the mobile electronic device to obtain a predicted grid.

Step (iv) may include rebounding the grid, and/or using the predicted grid in step (i) of the subsequent iteration.

Rebounding the grid may comprise moving a boundary of the grid to exclude cells having a probability value below the predetermined threshold, and/or moving the boundary to include cells having a probability value above the predetermined threshold. In some cases, cells exist beyond the boundary but have a probability value of zero. If, following any process, the probability value of such cells increases, the boundary is moved so as to include any such cells having probability values above the predetermined threshold. In some cases, no cells exist beyond the boundary. Following any process which results in alteration of probability values, the invention may comprise the step of defining temporary cells beyond the boundary, calculating probability values for these cells, and moving the boundary to include any such cells having probability values above the predetermined threshold.

Preferably, the motion model is linear, in order to alleviate problems regarding the computation load of the method.

One or more iterations may comprise the step of (v) calculating an expected value and a variance for the state of the mobile electronic device based on the updated grid.

According to a second aspect of the invention, there is provided a mobile electronic device including processing apparatus arranged to perform the method of the first aspect of the invention.

The present invention also comprises a computer program arranged to perform the method and a system in which the mobile electronic device of the present invention operates. The invention encompasses one or more aspects and embodiments in various combinations whether or not specifically mentioned (or claimed) in that combination.

BRIEF DESCRIPTION OF THE DRAWINGS

In order that the invention may more readily be understood, a description is now given, by way of example only, reference being made to the accompanying drawings, in which:—

DETAILED DESCRIPTION OF THE INVENTION

Figure 1:
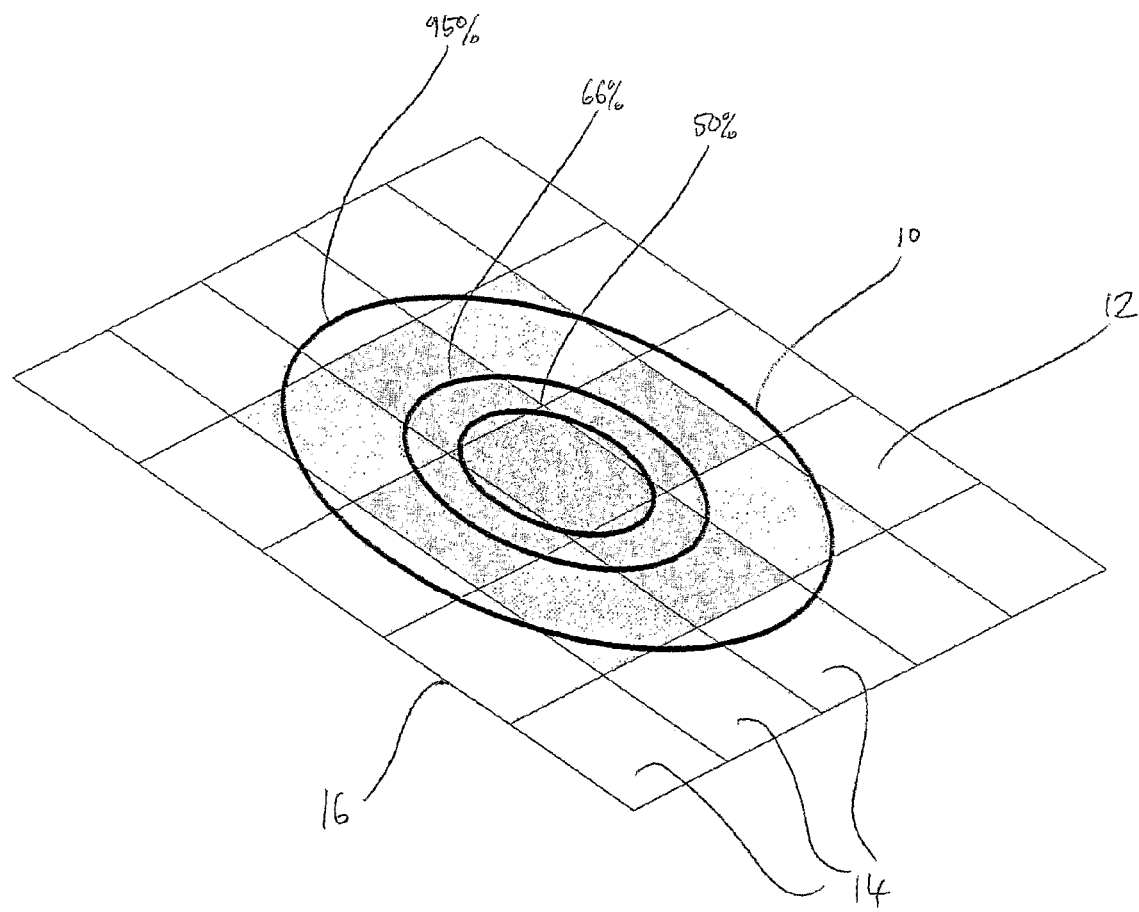
FIGS. 1 to 5 illustrate a simple example of the method of the invention being performed.

In the following description, like reference numerals refer to like features regardless as to which embodiment the features belong.

Figure 6:
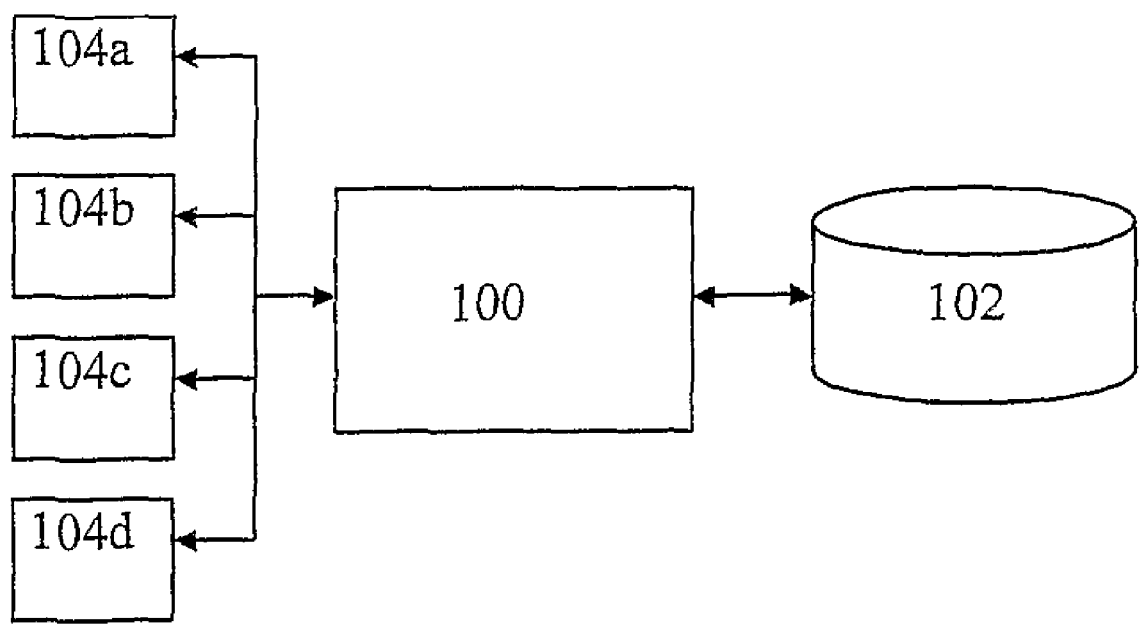
FIG. 6 shows an apparatus according to the invention.

FIG. 6 is a schematic diagram of part of a mobile electronic device according to the invention, the mobile electronic device including a processor 100 in communication with memory 102 and with a plurality of transceiver modules 104a-d. Memory 102 includes software code portions for performing the method of the invention, as will be described below. Transceiver modules 104a-d are capable of receiving measurement signalling respectively from the GPS system, cellular base stations, WLAN transmitters and Bluetooth transmitters. Transceiver modules 104a-d are referred to as such for convenience; in fact, some of the modules 104a-d may not have the capability to transmit, while others may be required to transmit in order to receive measurement signalling.

The method of the invention will now be described, using the following nomenclature.

Subscript k indexes the time instant
k|k−1 refers to inference made on time step k using data only up to time k−1
k|k refers to inference made on time step k using data up to time k
x the state of the mobile electronic device
i the vector index of a cell
$G_k(i)$ ith cell
$c_k(i)$ centre of the ith cell
$E_k$ square matrix whose columns define the edges of a cell
$\pi_{k|k-1}(i)$ prior probability value of the ith cell
$\pi_{k|k}(i)$ posterior probability value of the ith cell
$\phi_k(x|z)$ probability density of state x if the previous state was z
$L_k(x)$ measurement likelihood function
$\tau_k(i-j)$ probability (based on motion model) of moving from jth cell to ith cell Step (i)

In this step, the state $x_k$ of the mobile electronic device is represented using a grid comprising a plurality of cells. Each cell represents a region in state space and has a probability value that the state $x_k$ of the mobile electronic device is within that region.

For example, the state $x_k$ may comprise the three-dimensional state variables position $r_k$ and velocity $v_k$, $$x_k = \begin{bmatrix} r_k \\ v_k \end{bmatrix}.$$

Each cell is then six-dimensional to represent six-dimensional regions of state space. However, for illustrate purposes, FIGS. 1 to 5 show a simple example in which the state $x_k$ comprises a two-dimensional position $r_k$.

FIG. 1 shows a prior distribution 10 for the position of the mobile electronic device having 95%, 66% and 50% confidence regions. The prior distribution 10 may be derived from one of several sources: (i) a posterior distribution of a preceding iteration of the method; (ii) a predicted prior distribution obtained by altering the posterior distribution using a motion model to predict the movement of the mobile electronic device; and (iii) measurement signalling obtained via any of the transceiver modules 104a-d. In case several of the above sources are available, a combination can be used.

The prior distribution 10 is approximated using a prior grid 12 consisting of a number of two-dimensional cells 14 of uniform size and shape. Each cell 14 represents a region on the surface of the earth and has a prior probability value that the mobile electronic device is positioned within that region.

It is to be understood that FIG. 1 shows the prior distribution 10 as represented by the confidence regions on the grid 12 for illustrative purposes only. Although the prior distribution 10 is shown in FIG. 1 to be continuous, it would exist in the memory 102 of the mobile electronic device only in an approximated form by the probability values of the prior grid 12. The relative shading of the cells 14 in FIG. 1 represents the probability value, i.e. a darker-shaded cell 14 indicates a higher probability value for the cell 14.

The prior grid 12 includes a boundary 16 within which all cells 14 have a prior probability value above a predetermined threshold. Thus, the grid approximation of the prior distribution is truncated by the boundary 16 to represent a significant domain S, being a (simply connected) region in $\Re^{d,d}$, in which the prior probability values are non-negligible.

In the example of FIG. 1, the threshold is set such that 99% of the prior distribution is represented by the prior grid 12. However, it is to be understood that the level of the threshold is a matter of design choice. A lower threshold would result in more cells 14 being included within the boundary 16, and therefore in a more accurate approximation, albeit at the expense of an increased computational load. In contrast, a higher threshold would result in fewer cells 14 being included within the boundary, and therefore in a less accurate approximation with a reduced computational load.

Only cells 14 within the boundary 16 are defined in the memory 102 of the mobile electronic device. In a variant, the memory 102 defines cells beyond the boundary but with the prior probability value of these cells set to zero. In either case, the approximation by the prior grid 12 of the prior distribution 10 is truncated by the boundary 16 to facilitate computation.

The number of cells 14 in the prior grid 12 is a matter of design choice, in order to find a balance between computation load and accuracy. One extreme choice is to generate a large number of small cells. In this case, the approximation is asymptotically accurate even if the probability values are suboptimal, as is the case in the known point-mass filter, which uses only a density value being equivalent to that in the centre of a cell 14 according to the invention. Another extreme choice is to use a small number of large cells 14. It is then advantageous that the prior probability values be computed as accurately as possible. Most of the structure of the prior distribution 10 is lost when approximated with large cells 14. Optimally, the cells 14 should not be much smaller than the finest features of the prior distribution 10.

In this step, the time index k is set to k=1.

Step (ii)

In this step, measurement signalling is obtained via the transceiver modules 104*a-d* indicating values of one or more state variables.

Figure 2:
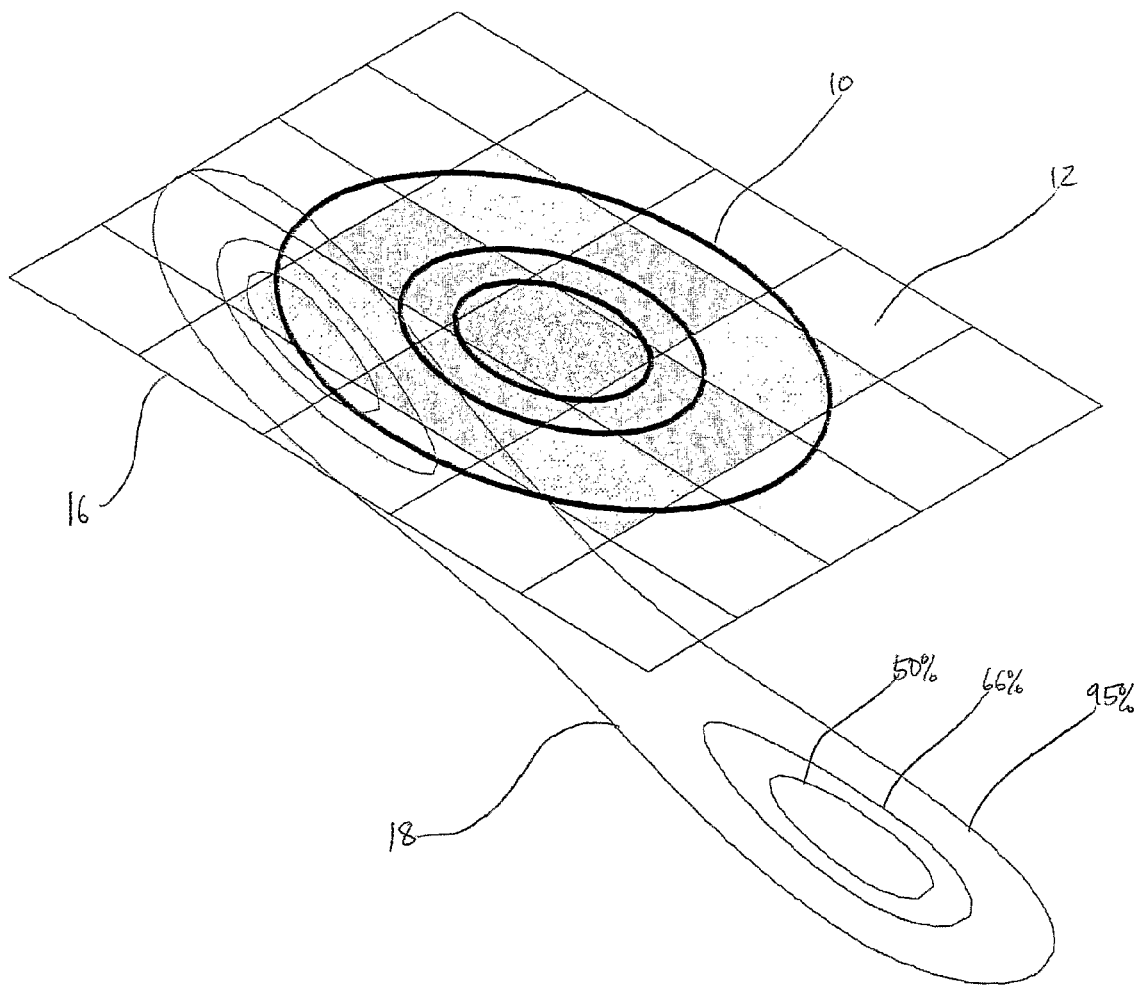

FIG. 2 shows a measurement likelihood function 18 representing an estimated position of the mobile electronic device based on measurement signalling obtained via the transceiver modules 104*a-d*. As shown, the measurement likelihood function includes 95%, 66% and 50% confidence regions.

Figure 3:
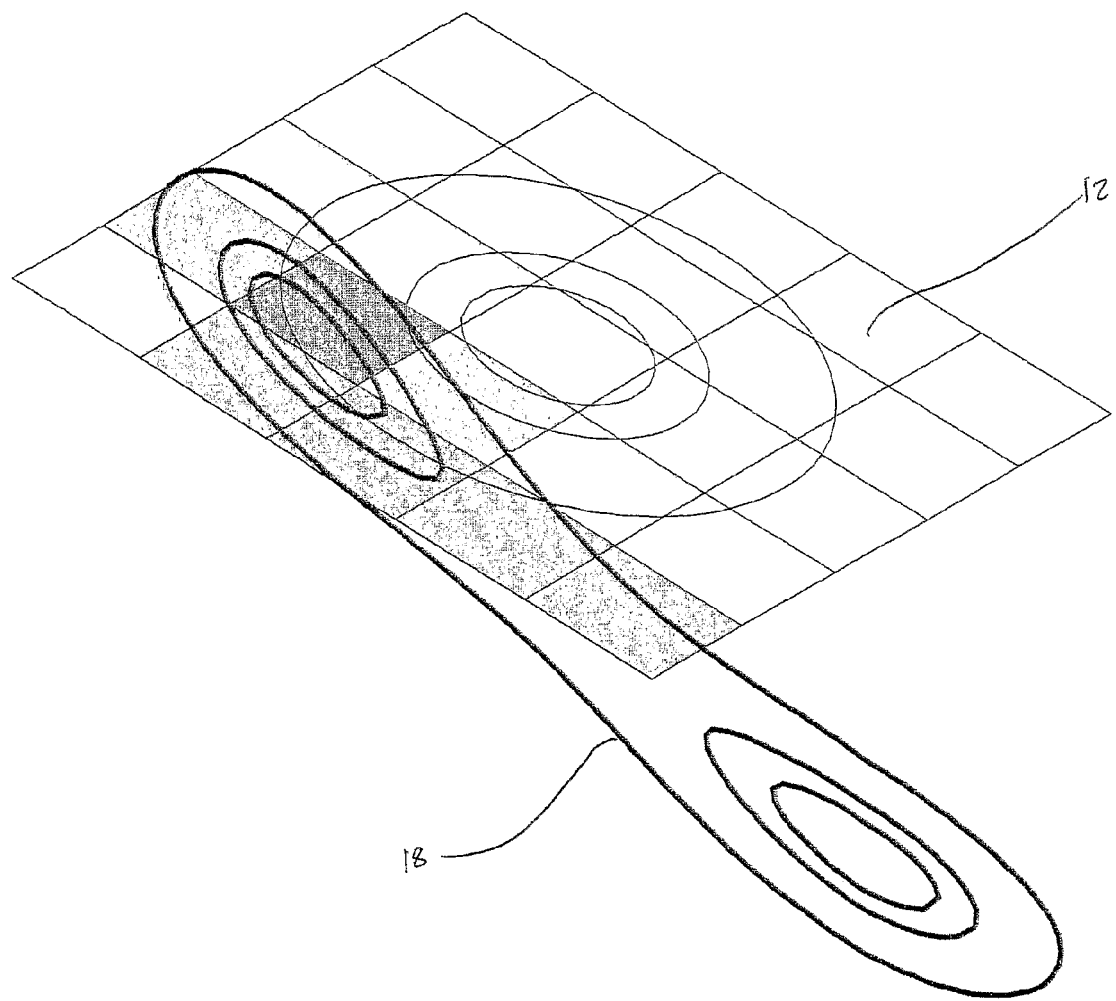

FIG. 3 shows the measurement likelihood function 18 being approximated using the prior grid 12 in a similar manner to the prior distribution 10. In FIG. 3, the probability values, which again represent the probabilities that the mobile electronic device is positioned within the regions represented by respective cells 14, are based only on the measurement likelihood function 18.

Although in FIG. 3 the measurement likelihood function 18 is approximated using the same prior grid 12 as for the prior distribution 10, it is to be understood that the measurement likelihood function could be represented using a grid of different size, shape and/or orientation, but that this would require more computation.

The measurement signalling may comprise any of, for example, a range, a range difference or a planar measurement in order to obtain a position estimate.

Given the true position r, a range measurement to a station at position s can be written as $h(r)=\|s-r\|$. The associated measurement error v need not be normal, and is represented by an empirically-determined distribution that matches the real situation.

The biased range measurements obtained from the GPS system are treated as range differences. One of the stations is chosen as reference station and all the differences are formed with respect to it. If the reference station is at $s_0$, the range difference measurement is $h(r)=\|s-r\|-\|s_0-r\|$.

Finally, the planar measurement is $h(r)=u^T r$, where u is a unit vector.

During this step, all available measurements are stacked into a vector $y_k$ and the corresponding measurement equations into a vector function $h_k(x)$.

As an example, consider the case with $n_d$ range difference measurements, $n_r$ range measurements, and $n_p$ planar measurements. Then the measurement vector is $y=[d_1 \ldots d_{nd} \; r_1 \ldots r_{nr} \; a_1 \ldots a_{np}]^T$, and the measurement model is $$h(x) = \begin{bmatrix} \|s_1-x\|-\|s_0-x\| \\ \vdots \\ \|s_{nd}-x\|-\|s_0-x\| \\ \|s_{nd+1}-x\| \\ \vdots \\ \|s_{nd+nr}-x\| \\ u_1^T x \\ \vdots \\ u_{n_p}^T x \end{bmatrix}.$$

If all the measurement errors have normal distributions, the measurement likelihood function 18 is $$L(x) \propto e^{\frac{1}{2}(h(x)-y)^T \Sigma^{-1}(h(x)-y)},$$

where $\Sigma$ is the covariance matrix of the measurement errors v.

Step (iii)

In this step, the prior probability values of the prior grid 12 are updated based on the measurement signalling to produce a posterior grid 12', and the posterior grid 12' is rebounded.

Figure 4:
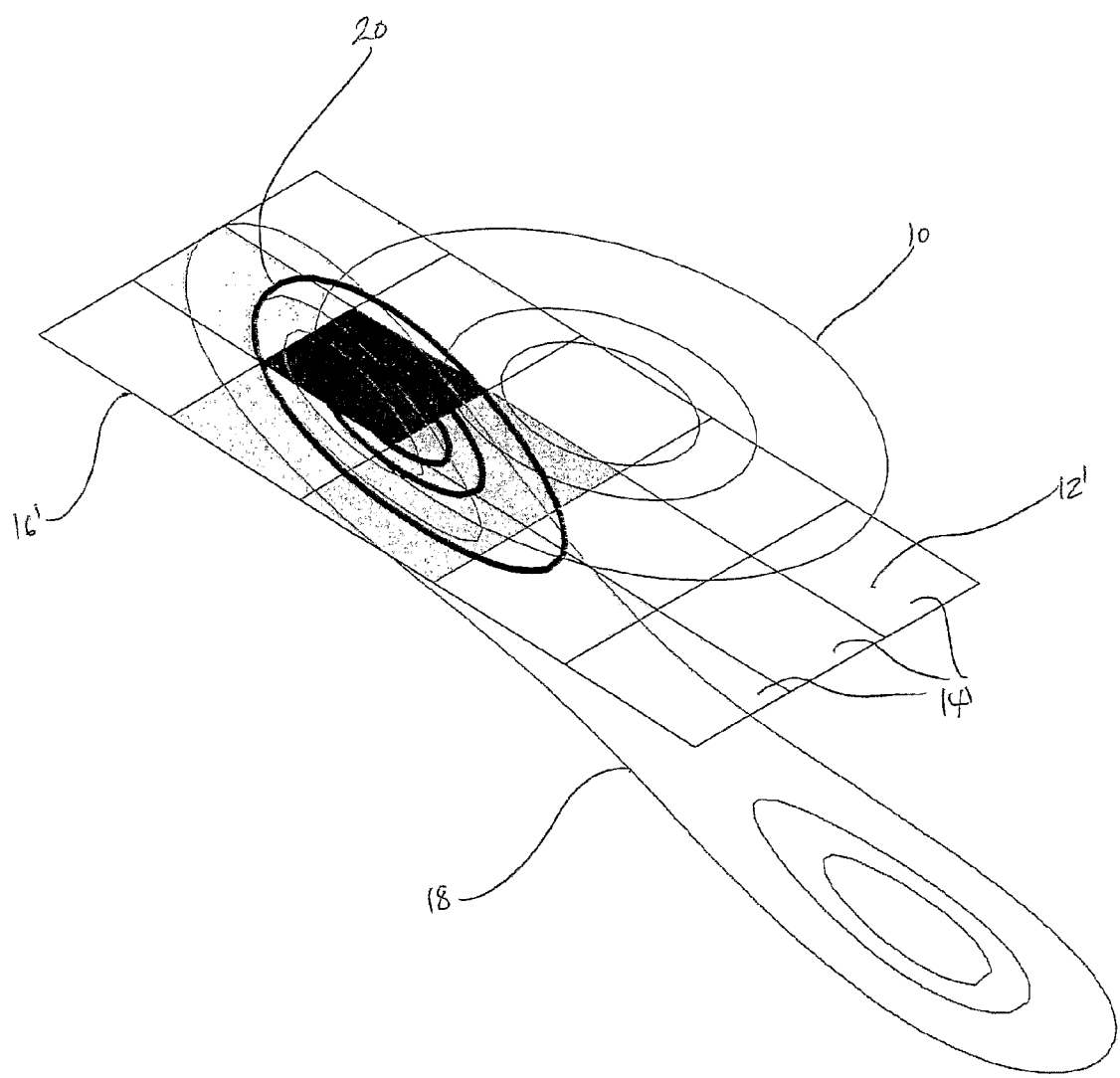

FIG. 4 shows a posterior distribution 20 having been derived from the prior distribution 10 and the measurement likelihood function 18. The posterior distribution 20 is represented by a posterior grid 12' having cells 14', each cell 14' having a posterior probability value to approximate the posterior distribution 20.

The posterior probability values of the posterior grid 12' are found by multiplying the prior probability value in each cell 14 with the total likelihood in the cell 14, found by integrating the likelihood function over the cell 14:

$$\hat{p}_{k|k}(x) \propto \hat{p}_{k|k-1}(x) L_k(x) \approx \sum_{i=0}^{n_k} \pi_{k|k}(i) \chi_{G_k(i)}(x),$$

where $$\pi_{k|k}(i) = \pi_{k|k-1}(i) \int_{G_k(i)} L_k(\xi) d\xi.$$

The posterior grid 12' is rebounded with new boundary 16' to include only cells 14' having a probability value above the predetermined threshold. If a cell 14 within previous boundary 16 has a posterior probability value below the predetermined threshold, the new boundary 16' is placed so as to exclude that cell 14.

Step (iv)

In this optional step, a predicted grid 12" having cells 14" is obtained based on the posterior grid 12' of the current iteration and a motion model for the mobile electronic device. The predicted grid 12" forms the prior grid 12 of the subsequent iteration.

Figure 5:
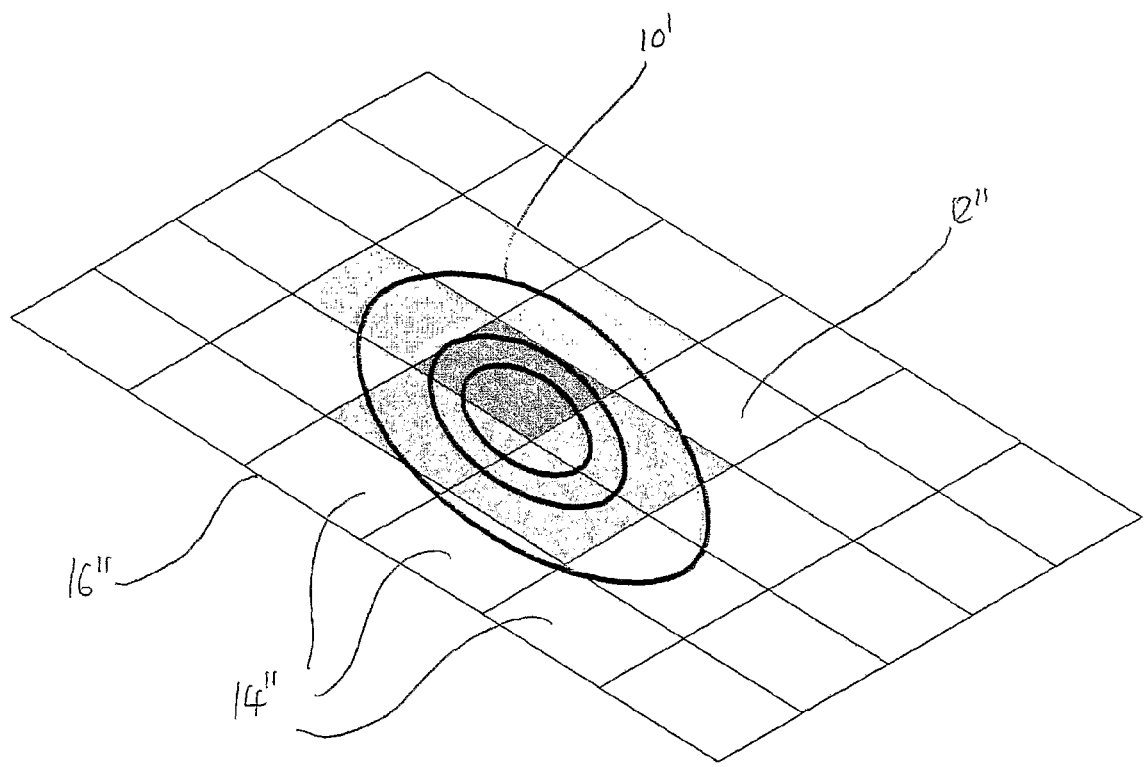

FIG. 5 shows the predicted prior distribution 10' following application of the motion model, the motion model being any suitable model such as a constant-velocity-normally-distributed-acceleration model or a singer model. The predicted prior distribution 10' will form the prior distribution 10 of the subsequent iteration of the method.

The predicted prior probability value of a cell 14" is found by summing all probabilities values in the current iteration weighted by the probabilities of transition to that cell 14", according to the following equations. The predicted prior distribution 10' is normalized after all probability values have been computed.

$$\hat{p}_{k|k-1}(x) = \int_{\mathcal{R}^d} \phi_{k-1}(x \mid \xi) \hat{p}_{k-1|k-1}(\xi) d\xi \approx \sum_{i=0}^{nk} \pi_{k|k-1}(i) \chi_{G_k(i)}(x).$$

Denoting the volume of each cell 14" with $\alpha_k = |\det E_k|$, the predicted prior probability values $\pi_{k|k-1}(i)$ are computed by integrating the predictive pdf over the cell 14":

$$\pi_{k|k-1}(i) = \frac{1}{\alpha_k} \int_{G_k(i)} p_{k|k-1}(v) dv$$

$$= \frac{1}{\alpha_k} \int_{G_k(i)} \left[ \int \phi_{k-1}(v \mid \xi) p_{k-1|k-1}(\xi) d\xi \right] dv$$

Replacing $p_{k-1|k-1}$ with its grid approximation yields $$\pi_{k|k-1}(i) \approx \frac{1}{\alpha_k} \sum_{j=0}^{n_{k-1}-1} \pi_{k-1|k-1}(j) \Gamma_k(i \mid j),$$

where $\Gamma_k(i|j)$ is the transition probability from jth cell of the (k−1)th grid to ith cell of the kth grid.

In the interest of computational efficiency, a linear motion model is used, e.g. $f(x)=Tx$. The predicted grid 12" is formed by applying the motion model to the posterior grid 12'. The transition probability between the ith cell in the old grid and the jth cell of the new grid depends only on the difference i−j, and we can write $\Gamma_k(i|j) = \tau_k(i-j)$. The predicted prior probability values become $$\pi_{k|k-1}(i) \approx \frac{1}{\alpha_k} \sum_{j=0}^{n_{k-1}-1} \pi_{k-1|k-1}(j) \tau_k(i \mid j)$$

which is fast to compute as a d-dimensional discrete linear convolution.

Now the transition probability $\tau_k(i-j)$ is $$\tau_k(i - j) = \frac{1}{\alpha_{k-1} \alpha_k} \int_{c_k(i) + E_k K} \left[ \int_{c_{k-1}(j) + E_{k-1} K} \phi(v \mid \xi) d\xi \right] dv$$

where $$K = \left( -\frac{1}{2}, \frac{1}{2} \right]^d.$$

This can be simplified to $$\tau_k(i - j) = \int_K p_{w_k} [E_k(i - j) + e_k - Te_{k-1} + E_k \lambda] d\lambda \quad (12)$$

$$= \int_K p_{w_k, i-j}(\lambda) d\lambda$$

where $p_{w,i-j}$ is shorthand for the modified process noise probability density function. Specifically, if $w_k \sim N(0, Q)$, then $$w_{k,i-j} \sim N(j-i-E_k^{-1}(e_k-Te_{k-1}), (E_k^{-1})^T Q E_k^{-1})$$

The integral then is just multinormal probability in a hyperbox and can be computed numerically.

If $w_k$ is non-Gaussian, the transition probabilities $\tau_k(i-j)$ can be computed using the cumulative distribution.

Following the application of the motion model, the boundary 16' is moved to become boundary 16" which includes all cells 14" both within and beyond the previous boundary 16' having a predicted probability value above the predetermined threshold.

In the case where cells 14" existed beyond the previous boundary 16' and had prior and posterior probability values of zero, the new boundary 16" is placed to include any of these cells 14" which have a predicted probability value above the predetermined threshold.

In the variant wherein no cells existed beyond the previous boundary 16', new cells 14" are added having a size, shape and orientation corresponding to that of existing cells 14', and the new boundary 16" is placed so as to include the new cells 14". It is to be understood that the size, shape and/or orientation of the new cells 14" need not coincide with those of the existing predicted grid 12". It can readily be determined whether such non-existent cells would have a probability value above the predetermined threshold by defining a number of temporary cells 14" beyond the previous boundary 16' and calculating predicted probability values for the temporary cells 14". Such temporary cells 14" are continually defined and their probability values calculated until a point is reached where a shell of temporary cells 14" having probability values below the threshold is created. The new boundary 16" is then placed so as to include all temporary cells 14" having probability values above the threshold.

Step (v)

In this step, an expected value and a variance for the state of the mobile electronic device are calculated based on the predicted grid 12", according to the following equations.

$$\mu_k = |\det E_k| \sum_{i=0}^{n} \pi_{k|k}(i) c_k(i) \quad (10)$$

$$\sum_k = |\det E_k| \sum_{i=0}^{n} \pi_{k|k}(i) c_k(i) c_k(i)^T - \mu_k \mu_k^T + \frac{|\det E_k|}{12} E_k E_k^T$$

Finally, the time index k is increased and the method repeated from Step (i).

It will be understood that the present invention uses a grid-mass approach to perform the method of tracking a state of a mobile electronic device.

The invention claimed is:

1. A method of tracking a state of a mobile electronic device comprising iteratively performing, using at least one apparatus:

(i) representing the state of the mobile electronic device using a grid comprising a plurality of cells, each cell representing a region in state space defined by one or more state variables and having a first probability value that the state of the mobile electronic device is within that region in state space, the grid being bounded to include only cells having a probability value above a predetermined threshold;

(ii) obtaining measurement signalling indicating values of one or more state variables;

(iii) updating the first probability values of the grid and rebounding the grid to obtain an updated grid comprising cells having a second probability value, the second probability value of a cell of the updated grid found by multiplying the first probability value with an integration of a measurement likelihood function over the cell of the updated grid; and (iv) predicting third probability values of the grid based on the updated grid and a motion model for the mobile electronic device to obtain a predicted grid for use in step (i) of a subsequent iteration, the third probability value of a cell of the predicted grid found by summing all second probability values in the current iteration weighted by a probability of transition to the cell of the predicted grid.

2. The method of claim 1 wherein the grid is a uniformly-spaced parallelepiped grid.

3. The method of claim 1 wherein step (i) in respect of one or more iterations further comprises forming the grid based on the measurement signalling.

4. The method of claim 1 wherein step (iv) further comprises rebounding the grid.

5. The method of claim 1 wherein the motion model is linear.

6. The method of claim 1 wherein one or more iterations comprise the step of
(v) calculating an expected value and a variance for the state of the mobile electronic device based on the predicted grid.

7. A mobile electronic device comprising a processor, a memory storing code, and at least one receiver module, the processor executing said code so as to iteratively:
(i) represent the state of the mobile electronic device using a grid comprising a plurality of cells, each cell representing a region in state space defined by one or more state variables and having a first probability value that the state of the mobile electronic device is within that region in state space, the grid being bounded to include only cells having a probability value above a predetermined threshold;
(ii) obtain measurement signalling indicating values of one or more state variables;
(iii) update the first probability values of the grid and rebounding the grid to obtain an updated grid comprising cells having a second probability value, the second probability value of a cell of the updated grid found by multiplying the first probability values with an integration of a measurement likelihood function over the cell of the updated grid; and
(iv) predict third probability values of the grid based on the updated grid and a motion model for the mobile electronic device to obtain a predicted grid for use in step (i) of a subsequent iteration, the third probability value of a cell of the predicted grid found by summing all second probability values in the current iteration weighted by a probability of transition to the cell of the predicted grid.

8. A memory storing code, which when executed by a processor performs iterative:
(i) representing of the state of a mobile electronic device using a grid comprising a plurality of cells, each cell representing a region in state space defined by one or more state variables and having a first probability value that the state of the mobile electronic device is within that region in state space, the grid being bounded to include only cells having a probability value above a predetermined threshold;
(ii) obtaining of measurement signalling indicating values of one or more state variables;
(iii) updating of the first probability values of the grid and rebounding the grid to obtain an updated grid comprising cells having a second probability value, the second probability value of a cell of the updated grid found by multiplying the first probability values with an integration of a measurement likelihood function over the cell of the updated grid; and
(iv) predicting of third probability values of the grid based on the updated grid and a motion model for the mobile electronic device to obtain a predicted grid for use in step (i) of a subsequent iteration, the third probability value of a cell of the predicted grid found by summing all second probability values in the current iteration weighted by a probability of transition to the cell of the predicted grid.

9. A system comprising:
a mobile electronic device comprising a processor, a memory storing code, and at least one receiver module, the processor executing said code so as to iteratively:
(i) represent the state of the mobile electronic device using a grid comprising a plurality of cells, each cell representing a region in state space defined by one or more state variables and having a first probability value that the state of the mobile electronic device is within that region in state space, the grid being bounded to include only cells having a probability value above a predetermined threshold,
(ii) obtain measurement signalling indicating values of one or more state variables,
(iii) update the first probability values of the grid and rebounding the grid to obtain an updated grid comprising cells having a second probability value, the second probability value of a cell of the updated grid found by multiplying the first probability values with an integration of a measurement likelihood function over the cell of the updated grid, and
(iv) predict third probability values of the grid based on the updated grid and a motion model for the mobile electronic device to obtain a predicted grid for use in step (i) of a subsequent iteration, the third probability value of a cell of the predicted grid found by summing all second probability values in the current iteration weighted by a probability of transition to the cell of the predicted grid; and
an apparatus for providing measurement signalling to the mobile electronic device.

10. An apparatus comprising:
means for iteratively representing the state of a mobile electronic device using a grid comprising a plurality of cells, each cell representing a region in state space defined by one or more state variables and having a first probability value that the state of the mobile electronic device is within that region in state space, the grid being bounded to include only cells having a probability value above a predetermined threshold;
means for iteratively obtaining measurement signalling indicating values of one or more state variables;
means for iteratively updating the first probability values of the grid and rebounding the grid to obtain an updated grid comprising cells having a second probability value, the second probability value of a cell of the updated grid found by multiplying the first probability values with an integration of a measurement likelihood function over the cell of the updated grid; and
means for iteratively predicting third probability values of the grid based on the updated grid and a motion model for the mobile electronic device to obtain a predicted grid for use by the means for representing the state of a mobile electronic device of a subsequent iteration, the third probability value of a cell of the predicted grid found by summing all second probability values in the current iteration weighted by a probability of transition to the cell of the predicted grid.

11. An apparatus comprising a processor, a memory storing code, and at least one receiver module, the processor executing said code so as to iteratively:
(i) represent the state of a mobile electronic device using a grid comprising a plurality of cells, each cell representing a region in state space defined by one or more state variables and having a first probability value that the state of the mobile electronic device is within that region in state space, the grid being bounded to include only cells having a probability value above a predetermined threshold;

(ii) obtain measurement signalling indicating values of one or more state variables;

(iii) update the first probability values of the grid and rebounding the grid to obtain an updated grid comprising cells having a second probability value, the second probability value of a cell of the updated grid found by multiplying the first probability values with an integration of a measurement likelihood function over the cell of the updated grid; and (iv) predict third probability values of the grid based on the updated grid and a motion model for the mobile electronic device to obtain a predicted grid for use in step (i) of a subsequent iteration, the third probability value of a cell of the predicted grid found by summing all second probability values in the current iteration weighted by a probability of transition to the cell of the predicted grid.

12. The apparatus of claim 11, wherein the processor is configured to represent the state of a mobile electronic device using a grid which is a uniformly-spaced parallelepiped grid.

13. The apparatus of claim 11, wherein the processor is configured to represent the state of a mobile electronic device, in one or more iterations, by obtaining measurement signalling and forming the grid based on the measurement signalling.

14. The apparatus according to claim 11, wherein the processor is configured to rebound the grid after predicting the third probability values.

15. The apparatus according to claim 11, wherein the apparatus is configured to use a linear motion model to represent the state of a mobile electronic device.

16. The apparatus according to claim 11, wherein the processor is configured to, in one or more iterations, calculate an expected value and a variance for the state of the mobile electronic device based on the predicted grid.

17. The apparatus according to claim 11, the apparatus comprising:
a plurality of transceiver modules, the plurality of transceiver modules configured to obtain said measurement signalling.

* * * * *